July 21, 1959 J. H. STOUDENMIRE 2,896,141

SELF-SYNCHRONOUS TRANSMISSION SYSTEM

Filed Sept. 30, 1958

INVENTOR.

JAY H. STOUDENMIRE

BY

K. G. Doub

ATTORNEY 2,896,141

SELF-SYNCHRONOUS TRANSMISSION SYSTEM

Jay H. Stoudenmire, Baltimore, Md., assignor to Bendix Aviation Corporation, Baltimore, Md., a corporation of Delaware Application September 30, 1958, Serial No. 764,435

9 Claims. (Cl. 318—24)

In the transmission of angular position or error voltage signals from a transmitter to a receiver in a self-synchronous system, or from one of such systems to another, it sometimes becomes necessary to convert 60 cycle synchro signals to 400 cycle signals, as when coupling two systems wherein one utilizes 60 cycle components and the other 400 cycle components. Again, regardless of whether or not frequency conversion is required, it may be desirable to increase the power available for positioning the receiver rotor or rotors so that multiple synchro receivers can be driven from a single low power transmitter; and power amplification also serves to isolate the synchro transmitter from load variations, thereby eliminating interference between receiver and transmitters where more than one system utilizes the position signal from a single transmitter. As far as known, previous synchro data or signal converters and amplifiers utilized a closed-loop feed-back system incorporating error-detecting control transformers or the like having mechanically coupled, servo-driven transmitter and receiver rotors involving gear trains and other electro-mechanical parts subject to degradation in performance over relatively short periods of use, thereby increasing the worry and cost of overhaul and maintenance. In contradistinction, the synchro system of the present invention is of the purely electronic type utilizing no moving parts.

The primary object of the present invention therefore is to provide a reliable system for converting the position signals in a synchro system from one power frequency to another while at the same time amplifying and isolating the synchro signals, by the use of a network and associated components involving no moving parts and as a result requiring little or no maintenance service for constant operation at maximum efficiency.

Figure 1:
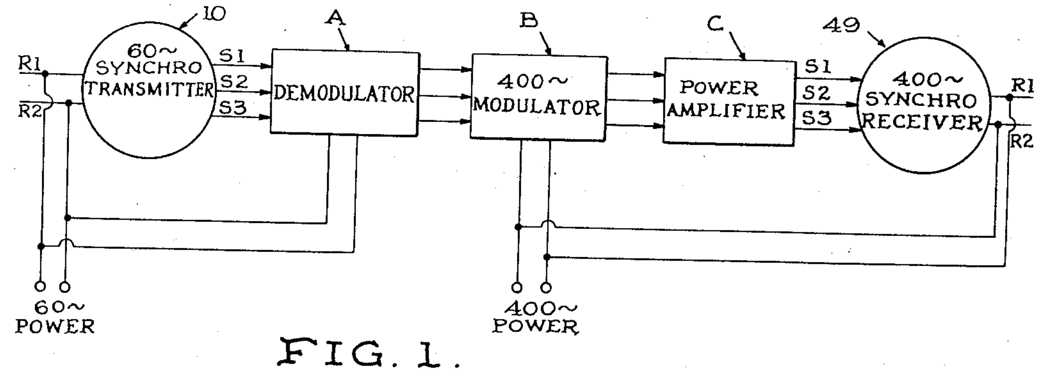
Figure 2:
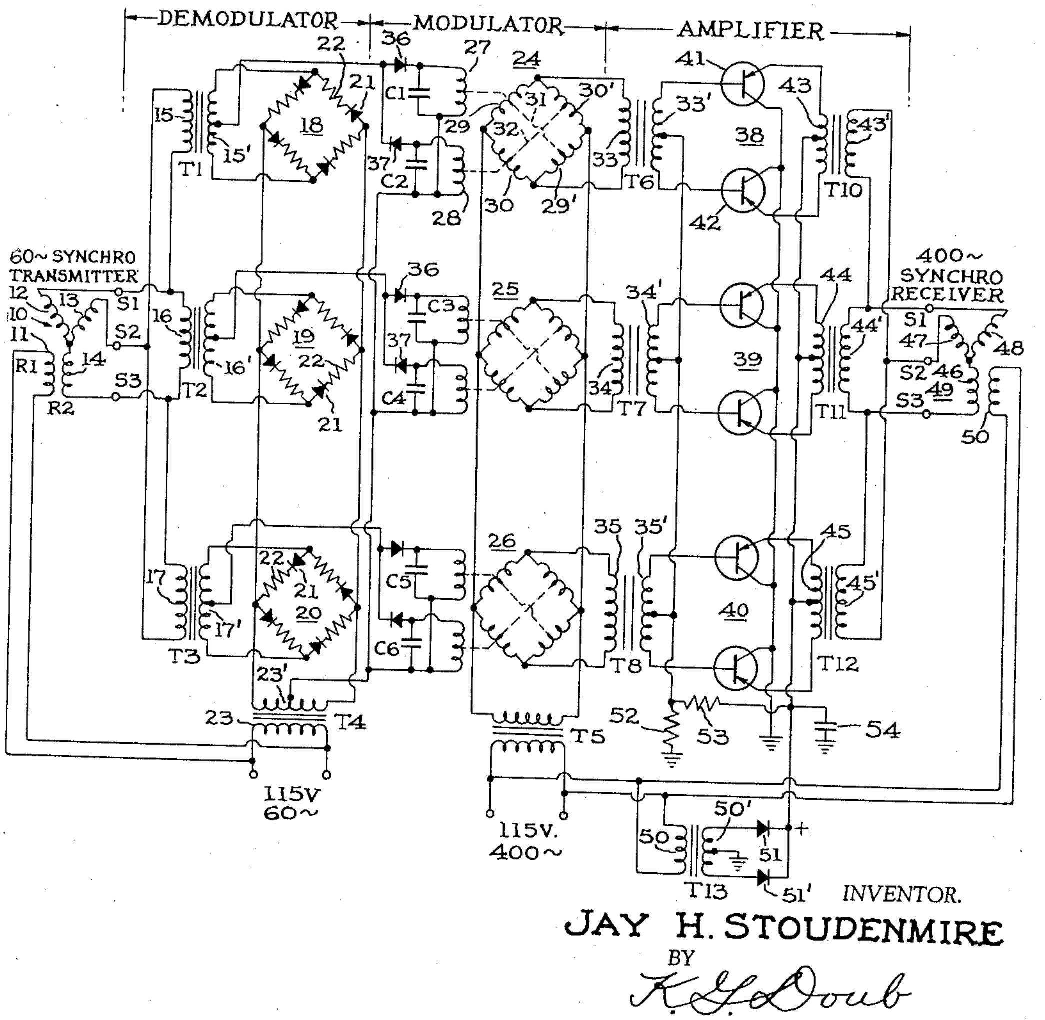

The foregoing and other objects and advantages will become apparent in view of the following description taken in conjunction with the drawings, wherein:

Fig. 1 is a block diagram of a converter and amplifier in accordance with the present invention, and Fig. 2 is a schematic of the circuitry shown in block diagram in Fig. 1.

The block diagram of Fig. 1 is self-explanatory as to the major components of the herein disclosed system. These major components comprise a 60 cycle transmitter 10, a demodulator section A, a modulator section B, an amplifying section C, and a 400 cycle receiver 49. To gain an understanding of what these components consist of and how they operate, recourse should be had to Fig. 2.

Referring now to Fig. 2, which is a wiring diagram of the actual circuitry and associated electrical components of Fig. 1, the 60 cycle transmitter 10 comprises the usual rotor winding 11 and stator windings 12, 13 and 14. The rotor winding is excited from a 115 volt, 60 cycle supply source through leads conventionally designated R1 and R2. Whenever position signal voltages are developed across the stator windings 12, 13 and 14, current flows in the primary windings 15, 16 and 17 of three demodulator input transformers indicated at T1, T2 and T3. The secondaries 15′, 16′ and 17′ of these input transformers are connected to the signal-input junctions of each of three ring-type demodulator or rectifier bridges 18, 19 and 20, which utilize solid state diodes 21 as current rectifiers, connected in series with current limiting resistors 22. A common 60 cycle reference phase voltage for all three bridges is supplied from a transformer T4, the primary 23 of which is connected to the 60 cycle input and the secondary 23′ of which is connected to the remaining two junctions, herein termed the "reference junctions" of the said bridges. The reference phase voltage causes the diodes in the upper and lower legs of the demodulator rings or bridges to conduct alternately at a 60 cycle rate, and when synchro signals are induced in the secondaries of the input transformers, they are applied to the upper and lower junctions of the bridges, whereupon a flow of full-wave rectified current ensues from the center tap of each of the secondaries to and through the associated control windings of modulator magnetic amplifiers, to be described, and back via the secondary center tap of the common excitation transformer T4, the magnitude of the rectified currents being proportional to the amplitudes of the signals.

The modulator section B preferably consists of three low-level magnetic amplifiers 24, 25 and 26, each having a substantially linear output characteristic. These amplifiers are identical in construction, and a description of one will suffice for all. Each amplifier comprises a pair of control windings 27 and 28 and four power output windings 29, 29′ and 30, 30′ connected in a bridge circuit. The relation of each control winding to its associated power windings is indicated by the dotted lines 31 and 32. Thus the winding 27 controls the output of windings 29 and 29′, while the winding 28 controls the output of windings 30 and 30′. All three amplifier bridge circuits are excited by a common 400 cycle reference voltage supplied from transformer T5, the primary of which is connected to a 115 volt, 400 cycle source of supply and the secondary of which is connected to the reference junctions of each amplifier bridge. The remaining two junctions of each amplifier bridge, or the signal-output junctions, are connected to the primaries 33, 34 and 35 of coupling transformers T6, T7 and T8, the secondaries 33′, 34′ and 35′ of which have their center taps commonly connected to a transistor bias potential at the junction of voltage divider resistors 52 and 53 and their opposite ends connected to the base electrodes of a pair of transistors, which function as power amplifiers for the 400 cycle signal output in a manner to be described. Germanium diodes 36 and 37 are connected in series with each of the control windings 27 and 28 of the magnetic amplifiers, to provide phase discrimination, and this feature together with the linear characteristics of the magnetic amplifiers assure adequate correspondence between the input and output synchro signals at all times. The capacitors indicated at C1 to C6, inclusive, act as filters to smooth out the ripple in the control currents so that these pulsations will not appear at the modulator output.

The amplifier section C of the improved system consists of three transistorized amplifiers generally indicated at 38, 39 and 40. Each amplifier comprises a pair of transistors 41, 42 connected in class B push-pull relation with the collectors grounded, resulting in an emitter-follower action. The base electrodes of each pair of transistors are connected to the output ends of the secondaries of the transformers T6, T7 and T8, as heretofore indicated, while the emitters are connected across the primaries 43, 44 and 45 of output transformers T10, T11 and T12, and the collectors to a common ground. The secondaries 43′, 44′, 45′ of the transformers T10, T11, T12 are connected to the leads S1, S2 and S3 of the stator coils 46, 47, 48 of a 400 cycle synchro receiver, generally indicated at 49, having its rotor coil excited from the common 115 volt, 400 cycle source. Operating potential is applied to the emitter circuit by means of a transformer T13, having its primary 50 connected to the supply lines and its secondary 50′ alternately delivering current to full-wave rectifiers 51, 51′. Capacitor 54 functions to filter the ripple in the rectified output.

The grounded collector arrangement of the transistor amplifiers affords a high degree of stability as a result of the nearly 100% degenerative feedback in the emitter circuit. Hence variations in supply voltage, output loading, temperature change, and ageing of components has virtually no effect on the terminal impedances and overall gain of the amplifier section, and phase shift and waveform distortion are minimized to an extent such that no appreciable position error will result therefrom.

*Operation*

When the rotor winding 11 of the transmitter 10 turns, signal voltages of different magnitude are induced in the transmitter coils 12, 13 and 14, the ratio of the signal voltages varying with the angular position of the rotor, and currents of proportional magnitude flow through the primaries of the signal input transformers T1, T2 and T3, inducing corresponding error or signal voltages in the secondaries of said transformers. These alternating signal voltages together with the 60 cycle reference voltage are impressed on the demodulator rings 18, 19 and 20, resulting in a flow of full wave rectified current from the center taps of the secondaries of each of said transformers to and through the control windings 27 and 28 of the modulator magnetic amplifiers 24, 25 and 26 and back via the secondary center tap of the common excitation transformer T4. The magnitude of the rectified currents will be proportional to the amplitude of the synchro signal and the direction of flow of said currents will be determined by the relative phase of the synchro signal and reference voltages. Thus as the rotor coil 11 of the transmitter 10 takes different angular positions with respect to the stator coils 12, 13 and 14, sine wave signal voltages are generated of varying amplitudes which are either in phase with the reference voltage or 180 degrees out of phase therewith. When the signal and reference voltages are in phase, the diodes 36, 37 permit rectified current to flow in one of the control windings 27, 28 and not in the other, and when the said voltages are out of phase, the action is reversed. This means that the 400 cycle output of the magnetic amplifiers and hence the modulator 24 will have the same signal-reference voltage phase relationship as that of the demodulator. Hence the demodulator circuits have a phase-sensing characteristic; they provide phase discrimination.

As long as no signal current is flowing in the control windings 27 and 28 of the magnetic amplifiers 24, 25 and 26, the bridges remain in balance, but as soon as signal current starts to flow in either one of said windings, the bridges become unbalanced in each phase and 400 cycle signal currents flow in the primaries 33, 34 and 35 of the coupling transformers T6, T7 and T8. The outputs of the magnetic amplifiers 24, 25 and 26 are raised to the desired power level by means of the transistorized amplifiers 38, 39 and 40, and the 400 cycle output signals, in correspondence with the position signals from the synchro transmitter 10, will be impressed on the receiver stator windings 46, 47 and 48 in the proper phase relationship and magnitude.

The improved system has proved in practice to be highly stable and dependable in performance. This is due to the fact that the system utilizes all electronic components completely devoid of moving parts such as servo motors, gear trains, and the like. Position errors are less than those of electromechanical converter systems since the latter systems must make allowance for the cumulative position errors of additional synchro units.

Once those skilled in the art have gained a knowledge of the fundamentals of the herein-disclosed system, variations in the circuitry and the particular type of associated electrical components for carrying out the desired operations will become apparent. Thus the modulator section need not necessarily utilize bridge-connected amplifiers; the more conventional single-core magnetic amplifiers with self-contained excitation windings may prove satisfactory, or a ring-type arrangement generally similar to those used in the demodulator section may serve the desired function. The magnetic amplifiers can be designed to perform the dual function of modulation and power amplification, in which case the transistorized amplifiers could be dispensed with. However, currently available high level magnetic amplifiers do not exhibit good linear output characteristics, whereas low level types can be readily designed for a substantially linear output. This is one of the reasons for employing a separate amplifying circuit. Also, the circuitry of Fig. 2 could be duplicated in reverse to convert from 400 to 60 cycle synchro signals and the two circuits interconnected by suitable switch mechanism. These and other modifications are contemplated within the scope of the invention as defined by the appended claims.

What I claim is:

1. In a self-synchronous transmission system, a transmitter and a receiver each having an exciting coil and a coacting set of transmission and receiving coils inductively related to the exciting coil, and an electrical signal frequency-converting and signal-amplifying network interconnecting said transmission and receiving coils comprising: a demodulator section provided with a signal-input transformer for each transmission and receiving coil, each transformer having its primary in circuit with one of said latter coils, and a demodulator circuit operatively related to each transformer, each of said demodulator circuits being in the form of a ring-type rectifier bridge having signal-input junctions in circuit with the secondary of each of said transformers, means for supplying a common reference voltage at a given frequency to the exciting coil of said transmitter and each of said bridges; a modulator section comprising a plurality of magnetic amplifiers each having output or load windings and coacting control windings for regulating the outputs of said load windings, circuits arranged to conduct the rectified signal current outputs of said demodulator bridges to and through said control windings, phase discriminating means in said latter circuits, means for supplying a common reference voltage at a frequency different from said first-named frequency to said amplifier output windings and the exciting coil of said receiver; and an electric signal-amplifying network connecting the output coils of said magnetic amplifiers with the transmission and receiving coils of the receiver.

2. In a self-synchronous transmission system, a transmitter and a receiver each having an exciting coil and a coacting set of transmission and receiving coils inductively related to the exciting coil, and an electrical signal frequency-converting and signal-amplifying network interconnecting said transmission and receiving coils comprising: a demodulating section provided with a signal-input transformer for each transmission and receiving coil, each transformer having its primary in circuit with one of said latter coils, and a demodulator circuit operatively related to each transformer, each of said demodulator circuits being in the form of a rectifier bridge having signal-input junctions in circuit with the secondary of each of said transformers, means for supplying a common reference voltage at a given frequency to the exciting coil of said transmitter and to each of said bridges; a modulator section comprising a plurality of magnetic amplifiers each having output or load windings connected in bridge circuit relation and a pair of control windings for regulating the outputs of said load windings, means for conducting the rectified signal current output of said demodulator bridges to and through said control windings, means for supplying a common reference voltage at a frequency different from said first-named frequency to said amplifier bridges and the exciting coil of said receiver; and an amplifier section comprising a plurality of coupling transformers having their primaries connected across the signal-output junctions of said amplifier bridges and electronic amplifying means connecting the secondaries of said coupling transformers to the transmission and receiving coils of said receiver.

3. A self-synchronous transmission system as claimed in claim 2, wherein said amplifying section includes a transistorized amplifier operatively related to each coupling transformer comprising a pair of transistors, each transistor having base, collector and emitter electrodes, the base electrodes of each pair being connected in circuit with the secondaries of said coupling transformers, the collectors being grounded, and output transformers inductively coupling the emitter circuits of said transistors with the receiving coils of said receiver.

4. In a self-synchronous transmission system, a transmitter and a receiver each having an exciting coil and a coacting set of transmission and receiving coils inductively related to the exciting coil, and an electrical signal frequency-converting and signal-amplifying network interconnecting said transmission and receiving coils comprising: a demodulator section provided with a signal-input transformer and a rectifier bridge for each transmission and receiving coil, each transformer having its primary in circuit with one of said latter coils and its secondary in circuit with one of said bridges, means for supplying a common reference voltage at a given frequency to the exciting coil of said transmitter and to said rectifying bridges, a modulator section comprising a plurality of magnetic amplifiers each having an output winding and a control winding, a circuit arranged to conduct the rectified signal current output of each of said demodulator bridges to and through said control windings, phase discriminating means in said latter circuit, means for supplying a common reference voltage at a frequency different from said first-named frequency to said magnetic amplifiers and exciting coil of said receiver, and electronic amplifying means functioning to conduct the outputs of said amplifiers to the transmission and receiving coils of said receiver.

5. In a self-synchronous transmission system, a transmitter and a receiver each havng an exciting coil and a coacting set of transmission and receiving coils inductively related to the exciting coil, and an electrical signal frequency-converting and signal-amplifying network interconnecting said transmission and receiver coils comprising: a demodulator section having therein means for rectifying the alternating signal voltage, means for supplying said rectifying means and the exciting coil of said transmitter with a common reference voltage, a modulator section for modulating the direct current from said rectifying means, means for supplying the current-modulating means and the exciting coil of said receiver with a common reference voltage having a frequency different from that of said first-named frequency, and an amplifying circuit incorporating purely electronic solid-state amplifier elements involving no moving parts connecting the output of the modulating means with the transmitting and receiving coils of said receiver.

6. A self-synchronous transmission system as claimed in claim 5 wherein said amplifying circuit comprises pairs of transistors inductively coupled in emitter-follower relation to the output of the modulator section and to the receiving coils of the receiver.

7. In a self-synhronous transmission system, a transmitter and a receiver each having an exciting coil and a coacting set of transmission and receiving coils inductively related to the exciting coil, and an electrical signal frequency-converting and signal-amplifying network interconnecting said transmission and receiver coils comprising: a demodulator section incorporating means for rectifying the alternating signal voltage, means for supplying said rectifying means and the exciting coil of said transmitter with a common reference voltage, a modulating section for modulating the direct current from said rectifying means including a magnetic amplifier having a substantially linear output characteristic and provided with a plurality of output coils and coacting control coils operatively related to said output coils, said control coils being in circuit with said rectifying means, means for supplying the output coils of said magnetic amplifier and said receiver with a common reference voltage having a frequency different from that of said first-named frequency, and amplifying means connecting the output coils of said magnetic amplifier with the transmitting and receiving coils of said receiver.

8. A self-synchronous transmission system as claimed in claim 7 wherein said amplifying means comprises a transistorized amplifier including a pair of transistors arranged in emitter-follower relation and inductively coupled to the output coils of said magnetic amplifier and the transmitting and receiving coils of said receiver.

9. A self-synchronous transmission system as claimed in claim 7 wherein phase-discriminating means are connected in circuit with the control coils of said magnetic amplifier and arranged to cause energization of one only of said pair of control coils when the signal and reference voltages are in phase and vice versa when the said voltages are out of phase.

No references cited.